July 12, 1927.

C. E. CAREY 1,635,574

AUTOMATIC STATION

Filed April 2, 1924  2 Sheets-Sheet 1

WITNESSES:
G. S. Neilson
A. H. Pendleton

INVENTOR
Charles E. Carey
BY
Wesley G. Carr
ATTORNEY

July 12, 1927.

C. E. CAREY 1,635,574

AUTOMATIC STATION

Filed April 2, 1924   2 Sheets-Sheet 2

WITNESSES:
G. J. Neilson
A. H. Pendleton

INVENTOR
Charles E. Carey
BY
Wesley G. Carr
ATTORNEY

Patented July 12, 1927.

1,635,574

UNITED STATES PATENT OFFICE.

CHARLES E. CAREY, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC STATION.

Application filed April 2, 1924. Serial No. 703,718.

My invention relates to automatic stations and particularly to stations for supplying energy to a plurality of direct-current load circuits.

One object of my invention is to provide an electrical translating station having two translating devices and two load circuits that shall have means for causing one of the translating devices to supply energy to both load circuits under predetermined conditions.

Another object of my invention is to provide an electrical translating station having two translating devices and two load circuits that shall have means for causing each of the translating devices to supply energy to only one of the load circuits under predetermined conditions.

Another object of my invention is to provide a translating station, of the above-indicated character, that shall supply energy to one load circuit at a voltage determined by conditions existing in that circuit and that shall supply energy to a second load circuit at a voltage determined by conditions existing therein.

A further object of my invention is to provide means in a station of the above-indicated character, for automatically equalizing the voltages of two circuits that are to be connected and for then automatically effecting such connection.

A further object of my invention is to provide a translating station, of the above-indicated character, that shall operate with the maximum economy possible, at the same time maintaining as high quality of service as possible.

Figure 1:
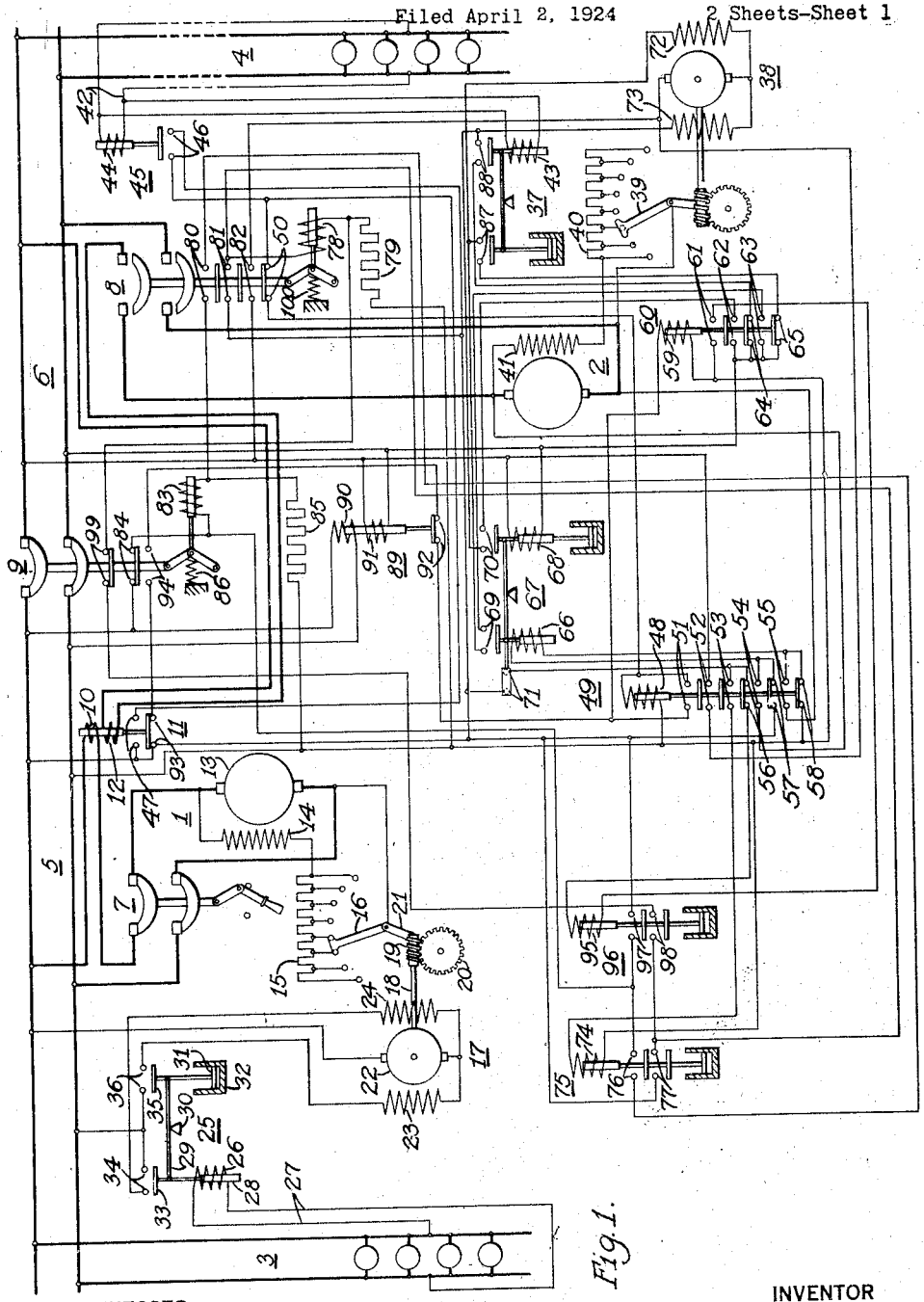
Figure 2:
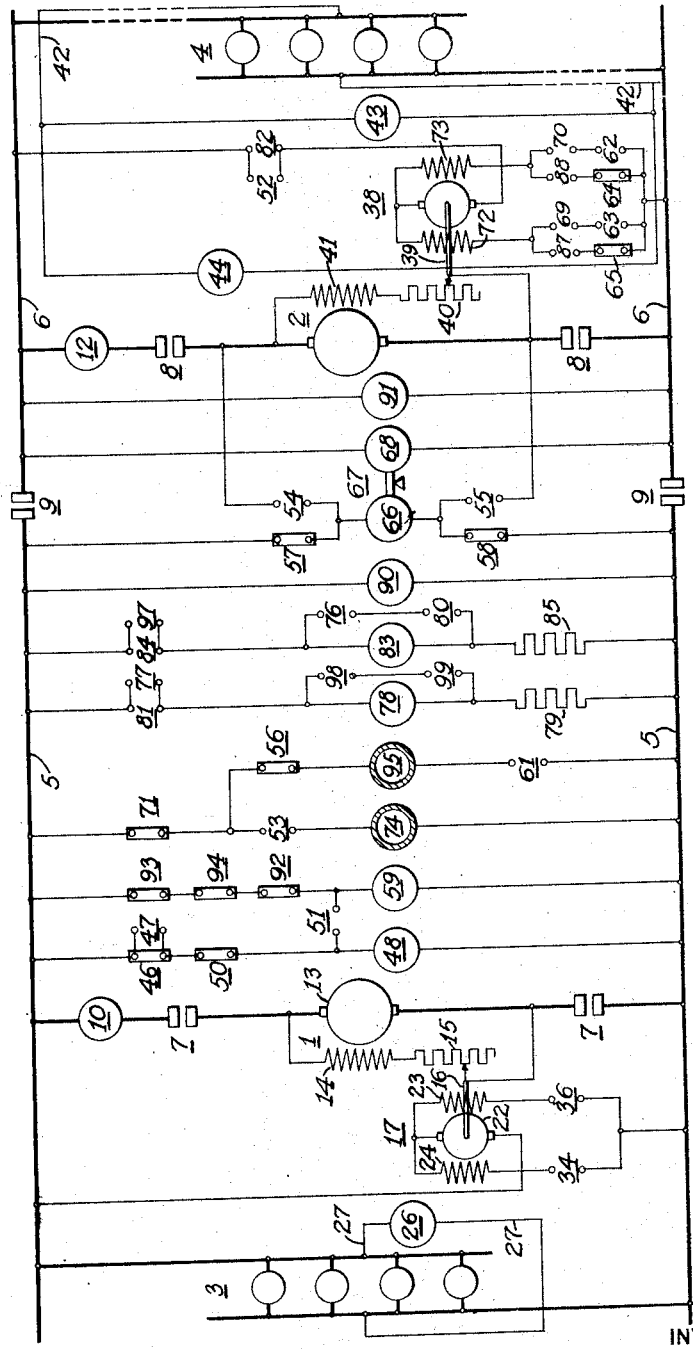

In the accompanying drawings,

Figure 1 is a diagrammatic representation of an electrical system in which my invention is embodied, and Fig. 2 is a schematic representation of the same circuits in which like reference numerals are applied to like parts throughout.

Referring to Fig. 1 of the drawings, translating devices 1 and 2 are adapted to supply energy to load circuits 3 and 4 through bus sections 5 and 6 and circuit interrupters 7 and 8, respectively. A portion of the load circuit 4 is shown in broken lines to indicate that this circuit may extend for a considerable distance from the translating station. A circuit interrupter 9 is provided for connecting the two bus sections 5 and 6.

It is desired that the translating device 1 shall supply energy to both the load circuits 3 and 4 while the total load demand on these circuits is within the capacity of the translating device 1 and while the voltage across the circuit 4 at substantially the load center thereof is within a predetermined amount of the normal voltage of the circuit. When this voltage falls to a predetermined value, however, or when the total load demand of the two load circuits exceeds the capacity of one translating device, it is desired that the translating device 2 shall be connected to the bus section 6 and that the circuit interrupter 9 shall be opened to disconnect the two bus sections 5 and 6.

The translating device 1 is adapted to be connected to the bus section 5 at all times when the station is in operation. This connection is effected by the manually-operated circuit interrupter 7. An operating coil 10 of a two-coil load relay 11 is connected in series with the circuit of the translating device 1, between the circuit interrupter 7 and the bus section 5. The second operating coil 12 of the load relay 11 is similarly connected in series with the circuit of the translating device 2 between the circuit interrupter 8 and the bus section 6.

The translating device 1 comprises an armature member 13 and a shunt field-magnet winding 14 having a variable resistor 15 in series therewith. The portion of the resistor 15 that is connected in circuit with the field-magnet winding 14 is determined by the position of a contact arm 16 that is actuated by a reversible motor 17 through a shaft 18, a worm 19, a worm wheel 20 and a shaft 21. The motor 17 comprises an armature member 22 and two series field-magnet windings 23 and 24.

The operation of the motor 17 is controlled by a voltage regulating device 25 that has an operating coil 26 connected through pilot wires 27 across the load circuit 3 at substantially the load center thereof. The operating coil 26 of the regulating device 25 co-operates with an armature member 28 that is mounted at one end of a lever arm 29. The lever arm 29 is supported on a pivot 30 and has mounted on the opposite end from that on which the armature member 28 is mounted, the piston 31 of a dash pot 32.

A the same end of the lever arm 29 that supports the armature member 28, a bridging member 33 is mounted that is adapted to engage contact members 34 when the energization of the coil 26 is sufficient to raise the armature member 28 a predetermined distance above its normal position. A bridging member 35, that is mounted on the opposite end of the lever arm 29, is similarly adapted to engage contact members 36 when the energization of the coil 26 is below a predetermined value, such that the armature member 28 is permitted to fall a predetermined distance from its normal position. It will be understood that by the "normal position" of the armature member 28 is meant that position corresponding to the energization of the coil 26 at the normal or desired voltage at the load center of the load circuit 3.

The operation of the regulating device 25 is apparent from the foregoing description of its structure, but it may be described as follows: When the voltage across the load circuit 3 at the load center thereof is below the normal or desired value, the energization of the operating coil 26 of the regulating device 25 is insufficient to maintain the armature member 28 in its normal position. It therefore drops to cause the bridging member 35 to engage the contact members 36, thereby connecting the armature member 22 and the series field-magnet winding 23 of the reversible motor 17 across the bus section 5. The motor 17 is thereupon caused to rotate in such direction that the contact arm 16 is actuated to lessen the amount of the resistance 15 that is connected in circuit with the shunt field-magnet winding 14 of the translating device 1.

As the effective portion of the resistor 15 is lessened, the field strength of the translating device 1 is increased until the voltage generated by the translating device is increased to such value that the voltage across the load circuit 3 at the load center thereof is again normal. Thereupon the operating coil 26 of the regulating device 25 is energized sufficiently to cause the bridging member 35 to be actuated out of engagement with the contact members 36. The circuit extending through the armature member 22 and field-magnet winding 23 of the motor 17 is thus interrupted and operation of the motor is stopped.

When the voltage of the load circuit 3 exceeds the normal or desired value, the operating coil 26 of the regulating device 25 is energized to such degree that the armature member 28 causes the bridging member 33 to engage the contact members 34, thereby connecting the armature member 22 and the series field-magnet winding 24 of the reversible motor 17 across the bus section 5. When the motor 17 is thus energized, the armature member 22 is caused to rotate in the opposite direction to that previously described so that it now actuates the contact arm 16 in such direction as to increase the effectiveness of the resistor 15.

The field strength of the translating device 1 is thus lessened to cause the voltage generated by the translating device also to be lessened. When this voltage has decreased to such value that the voltage across the load circuit 3 is again of normal value, the bridging member 33 of the regulating device 25 is permitted to disengage the contact member 34, thereby de-energizing the motor 17 to stop the operation thereof. The dash pot 32 is provided for the purpose of damping the action of the regulating device 25 in order to make this device more stable in its operation.

The translating device 2 is provided with a voltage regulating device 37 that is similar to the regulating device 34 of the translating device 1. The regulating device 37 cooperates with a reversible motor 38 and a contact arm 39 to vary the effectiveness of a variable resistor 40 that is connected in series with a shunt field-magnet winding 41 of the translating device 2 in the same manner as described for the translating device 1.

Pilot wires 42 extend from the load center of the load circuit 4 to the terminals of an operating coil 43 of the regulating device 37 and also to the terminals of an operating coil 44 of a voltage relay 45. The voltage relay 45 is provided with contact members 46 that are connected in parallel relation with contact members 47 of the load relay 11 and that are adapted to be engaged when the voltage across the load circuit 4 at the load center thereof is below a predetermined value.

The contact members 47 of the load relay 11 are adapted to be engaged when the total load demand on the translating devices 1 and 2 is in excess of a predetermined value. Inasmuch as the translating device 2 is not now in operation, as the drawings indicate, the load relay 11 is responsive only to the load demand on the translating device 1, and the contact members 47 will be engaged when the load demand on the translating device 1 exceeds the capacity thereof or when such load demand exceeds any other desired predetermined value.

When either or both of the contact members 46 and 47 are engaged, in response to the conditions mentioned above, a circuit extending from the bus section 5 to the operating coil 48 of a transfer relay 49 is completed. This circuit extends through auxiliary contact members 50 of the circuit interrupter 8 that are engaged when this circuit interrupter is in its open position, as is now the case. When the operating coil 48 of the transfer relay 49 is energized from the bus section 5, this relay effects engagement of its contact members 51, 52, 53, 54 and 55 and disengagement of its contact members 56, 57, and 58.

Engagement of the contact members 52 effects connection between one terminal of the armature member of the reversible motor 38 and one side of the bus section 6. Engagement of the contact members 51 completes a circuit for connecting the operating coil 59 of a second transfer relay 60 in parallel relation with the operating coil 48 of the transfer relay 49, thereby causing the coil 59 also to be energized from the bus section 5. When the operating coil 59 of the transfer relay 60 is energized, this relay effects engagement of its contact members 61, 62 and 63 and disengagement of its contact members 64 and 65.

When the contact members 54 and 55 of the transfer relay 49 are engaged, an operating coil 66 of a voltage balancing device 67 is connected across the terminals of the translating device 2. It will be assumed either that the translating device 2 is kept in operation without load while the circuit interrupter 8 is open or that it is started in response to predetermined conditions when it is desired that it be connected to the bus section 6 for supplying energy thereto.

The voltage balancing device 67 is provided with a second operating coil 68 that is connected across the bus section 6 and that is differentially disposed with respect to the coil 66. The balancing device 67 is similar to the regulating devices 25 and 37 except that it is normally balanced and is provided with two operating coils instead of one. When the energization of the coil 66 is greater than that of the coil 68, contact members 69 are engaged; when the opposite condition prevails, contact members 70 are engaged; and when the two coils are equally energized, contact members 71 are engaged.

Contact members 69 of the balancing device 67 are connected in series with the contact members 63 of the transfer relay 60 and a series field-magnet winding 72 of the reversible motor 38. The contact members 70 are similarly connected in series with the contact members 62 of the relay 60 and a series field-magnet winding 73 of the motor 38. Thus, when the operating coil 59 of the transfer relay 60 is energized, the operation of the reversible motor 38 is controlled by the voltage balancing device 67.

Inasmuch as the coil 68 of the balancing device 67 is connected across the bus section 6 and the coil 66 is connected across the terminals of the translating device 2, it is evident that the balancing device 67 will co-operate with the reversible motor 38, the contact arm 39, the resistance 40 and the shunt field-magnet winding 41 of the translating device 2, to make the voltage generated by the translating device 2 equal to the voltage across the bus section 6. This operation, which is accomplished by alternate engagement of the contact members 69 and the contact members 70, is similar to that described in detail with respect to the operation of the regulating device 25.

When the voltage between the terminals of the translating device 2 has been made equal to that of the bus section 5, the balancing device 67 will assume the normal position shown in the drawings, when the contact members 71 are engaged. The contact members 71 are connected in series with the contact members 53 of the transfer relay 49 and an operating coil 74 of a time-delay relay 75 across the bus section 5. The time setting of the relay 75 is such that it will not effect engagement of its contact members 76 and 77 until the voltage balancing device 67 has come to its balanced position, when the contact members 71 are engaged for a relatively long interval of time. Within a predetermined interval of time after this balanced condition occurs, the contact members 76 and 77 of the relay 75 are engaged.

When the contact members 77 of the relay 75 are engaged, a circuit extending from the bus section 5, to an operating coil 78 of the circuit interrupter 8, is completed through a resistor 79. The circuit interrupter 8 is thereupon closed to connect the translating device 2 to the bus section 6 and to effect engagement of auxiliary contact members 80, 81 and 82 and disengagement of the auxiliary contact members 50.

The auxiliary contact members 81 so shunt the contact members 77 of the time-delay relay 75 that energization of the operating coil 78 of the circuit interrupter 8 is maintained after the contact members 77 are disengaged. In like manner, the contact members 82 so shunt the contact members 52 of the transfer relay 49 as to maintain connection between one terminal of the armature member of the reversible motor 38 and one side of the bus section 6 after the contact members 52 are disengaged.

Up to the time when the circuit interrupter 8 is closed, the circuit interrupter 9 is held closed by the energization of its operating coil 83 that is connected across the bus section 5 through auxiliary contact members 84 of the circuit interrupter 9 and a resistor 85. When the circuit interrupter 8 is closed, however, its auxiliary contact members 80 co-operate with the contact members 76 of the relay 75 to short-circuit the operating coil 83 of the circuit interrupter 9, thereby permitting a compression spring 86 to effect opening of the circuit interrupter 9.

When the auxiliary contact members 50 are disengaged because of the closing of the circuit interrupter 8, the circuits extending through the operating coils 48 and 59 of the transfer relays 49 and 60, respectively, are interrupted to permit these relays to return to their de-energized positions. The contact members 53 of the relay 49 being thus disengaged, the circuit extending through the operating coil 74 of the time-delay relay 75 is interrupted to permit this relay also to return to its de-energized position.

When the contact members 63 and 64 of the transfer relay 60 are disengaged and the contact members 64 and 65 of the same relay are engaged because of the de-energization of the operating coil 59, connection of the series field-magnet windings 72 and 73 of the reversible motor 38 is transferred from the contact members 69 and 70 of the voltage balancing device 67 to contact members 87 and 88 of the voltage regulating device 37.

Thenceforth, the voltage generated by the translating device 2 is controlled by the regulating device 37 co-operating with the reversible motor 38, contact arm 39, variable resistance 40 and shunt field-magnet winding 41 of the translating device 2, to maintain the voltage of the load circuit 4 at the load center thereof at a predetermined value. This operation is accomplished by the connection of the operating coil 43 of the regulating device 37 through the pilot wires 42 to the load center of the load circuit 4.

The two bus sections 5 and 6 are now disconnected because the circuit interrupter 9 is open, and are individually receiving energy from the translating devices 1 and 2, respectively. This condition of operation has been accomplished, as described in detail above, in response to either an excessive load demand on the translating device 1 or a decrease of voltage of the load circuit 4, at the load center thereof, below a predetermined value.

It is now desired to maintain this condition of operation until the total load demand on the translating devices 1 and 2 has decreased to such value that it is within the capacity of one translating device, and also until the difference in voltage of the two bus sections 5 and 6 has decreased to a predetermined value. When these two conditions occur simultaneously, it is desired that the voltages of the bus sections 5 and 6 shall be equalized, the circuit interrupter 9 closed to connect the two bus sections, and the circuit interrupter 8 opened to disconnect the translating device 2 from the system. The means for accomplishing this result will now be described.

A differential voltage relay 89, comprising two operating coils 90 and 91 and a pair of contact members 92, is provided for indicating the decrease of difference in voltage between the bus sections 5 and 6 to a predetermined value. When this condition occurs, the energization of the coils 90 and 91 sufficiently approaches a state of balance to permit the contact members 92 to be engaged. The contact members 92 are connected in series with contact members 93 of the load relay 11, auxiliary contact members 94 of the circuit interrupter 9 that are engaged when this circuit interrupter is open, and the operating coil 59 of the transfer relay 60 across the bus section 5.

The contact members 93 of the load relay 11 are adapted to be engaged when the total load demand on the translating devices 1 and 2 has decreased to within the capacity of one translating device. When this total demand has decreased to such value and the difference in voltage of the bus sections 5 and 6 has decreased to such value that the contact members 92 of the differential voltage 89 are engaged, the operating coil 59 of the transfer relay 60 is energized. The relay 60 thereupon effects engagement of its contact members 61, 62 and 63 and disengagement of its contact members 64 and 65.

As has been previously described, the actuation of the relay 60 transfers the control of the reversible motor 38 from the voltage regulating device 37 to the voltage balancing device 67. Since the operating coil 48 of the transfer relay 49 is not now energized, however, connection is maintained between the bus section 5 and the operating coil 66 of the voltage balancing device 67. The voltage generated by the translating device 2 is therefore regulated until the voltage of the bus section 6 is made equal to that of the bus section 5, when it is permissible to close the circuit interrupter 9 to connect the two bus sections.

The circuit extending through the operating coil 74 of the time-delay relay 75 is now open because the contact members 53 of the transfer relay 49 are disengaged, but the operating coil 95 of a time-delay relay 96 is adapted to be energized from the bus section 5 through the contact members 71 of the voltage balancing device 67, contact members 56 of the transfer relay 59 that are engaged because the operating coil 48 of this relay is de-energized, and contact members 61 of the transfer relay 60 that are now engaged.

The time-delay relay 96 is similar to the relay 75 in that its contact members 97 and 98 are not energized as soon as the contact members 71 of the voltage balancing device 67, but only after the balanced condition has prevailed to maintain energization of the operating coil 95 for a predetermined interval of time. When this interval of time has elapsed, the contact members 97 and 98 of the time-delay relay are engaged. Engagement of the contact members 97 completes a circuit extending from the bus section 5 to the operating coil 83 of the circuit interrupter 9 through the resistor 85. The circuit interrupter 9 is thereupon closed to connect the bus sections 5 and 6 and to effect engagement of auxiliary contact members 84 and 99 and disengagement of the auxiliary contact members 94.

The contact members 84 so shunt the contact members 97 of the time-delay relay 96 as to maintain energization of the operating coil 83 of the circuit interrupter 9 after the contact members 97 are disengaged.

The auxiliary contact members 99 of the circuit interrupter 9 co-operate with the contact members 98 of the time-delay relay 96 to short-circuit the operating coil 78 of the circuit interrupter 8. The circuit interrupter 8 is thereupon opened by the action of a compression spring 100 to disconnect the translating device 2 from the bus section 6.

When the auxiliary contact members 94 are disengaged because of closing of the circuit interrupter 9, the circuit extending through the operating coil 59 of the transfer relay 60 is interrupted to permit this relay to return to its deenergized condition.

When the circuit interrupter 8 is opened, its auxiliary contact members 82 are disengaged to disconnect one terminal of the armature member of the reversible motor 38 from one side of the bus section 6. The motor 38 is thereby rendered ineffective to actuate the contact arm 39 to vary the amount of the resistor 40 that is connected in circuit with the shunt field-magnet winding 41 of the translating device 2. Inasmuch as the translating device 2 is disconnected from the system, it is not necessary that its voltage be subjected to the control of the motor 38 and the regulating device 37. The motor 38 remains ineffective until the transfer relay 49 effects engagement of its contact members 52 as previously described.

The two bus sections 5 and 6 are now connected because the circuit interrupter 9 is closed and the translating device 1 is alone supplying energy to both load circuits 3 and 4 because the circuit interrupter 8 is open to disconnect the translating device 2 from the system. These conditions are the same as those originally described, and the apparatus in the station is in condition to respond to the same conditions as previously described to connect the translating device 2 to the system and to then disconnect the bus sections 5 and 6.

It will be understood that the system embodying my invention is not limited to the specific details of construction and connections that have been shown in the drawings and described in the foregoing specification, as many changes and modifications may be made therein without departing from the spirit and scope of my invention, as set forth in the appended claims.

I claim as my invention:

1. In an electrical system, the combination with two bus sections, connecting means therebetween, a load circuit connected to each bus section, a supply circuit for each bus section, and connecting means between each supply circuit and the corresponding bus section, of means for maintaining the connecting means between the two bus sections and the connecting means between one of the supply circuits and the corresponding bus section effective, and for maintaining the connecting means between the other supply circuit and bus section ineffective while the voltage across one of the load circuits is above a predetermined value and the total power demand of the two load circuits is below a predetermined value.

2. In an electrical system, the combination with two bus sections, connecting means therebetween, a load circuit connected to each bus section, a supply circuit for each bus section and connecting means between each supply circuit and the corresponding bus section, of means for maintaining the connecting means between the two bus sections ineffective and the connecting means between each of the supply circuits and the corresponding bus section effective while the difference in voltage of the two bus sections is above a predetermined value.

3. In an electrical system, the combination with two bus sections, connecting means therebetween, a load circuit connected to each bus section, a supply circuit for each bus section and connecting means between each supply circuit and the corresponding bus section, of means responsive to the potentials of both bus sections for maintaining the connecting means between the two bus sections ineffective and the connecting means between each of the supply circuits and the corresponding bus section effective.

4. In an electrical system, the combination with two bus sections, connecting means therebetween, a load circuit connected to each bus section, a supply circuit for each bus section and connecting means between each supply circuit and the corresponding bus section, of means operative while the connecting means between the two bus sections and only one of the connecting means between the supply circuits and the respective bus sections are effective, for equalizing the voltages of the disconnected supply circuit and the corresponding bus section in response to predetermined conditions, means dependent upon said voltage equalization for rendering the connecting means between said last-named supply circuit and bus section effective, and means dependent upon the actuation of said connecting means for rendering the connecting means between the two bus sections ineffective.

5. In an electrical system, the combination with two bus sections, connecting means therebetween, a load circuit connected to each bus section, a supply circuit for each bus section and connecting means between each supply circuit and the corresponding bus section, of means operative while the connecting means between the two bus sections and only one of the connecting means between the supply circuits and the respective bus sections are effective, for equalizing the voltages of the disconnected supply circuit and the corresponding bus section when the voltage across one of the load circuits is below a predetermined value, means dependent upon said voltage equalization for rendering the connecting means between said last-named supply circuit and bus section effective, and means dependent upon the actuation of said connecting means for rendering the connecting means between the two bus sections ineffective.

6. In an electrical system, the combination with two bus sections, connecting means therebetween, a load circuit connected to each bus section, a supply circuit for each bus section, and connecting means between each supply circuit and the corresponding bus section, of means operative while the connecting means between the two bus sections and only one of the connecting means between the supply circuits and the respective bus sections are effective, for equalizing the voltages of the disconnected supply circuit and the corresponding bus section when the voltage across the load circuit that is connected to said last-named bus section is below a predetermined value, means dependent upon said voltage equalization for rendering the connecting means between said last-named supply circuit and bus section effective, and means dependent upon the actuation of said connecting means for rendering the connecting means between the two bus sections ineffective.

7. In an electrical system, the combination with two bus sections, connecting means therebetween, a load circuit connected to each bus section, a supply circuit for each bus section and connecting means between each supply circuit and the corresponding bus section, of means operative while the connecting means between the two bus sections and only one of the connecting means between the supply circuits and the respective bus sections are effective, for equalizing the voltages of the disconnected supply circuit and the corresponding bus section when the total power demand of the two load circuits is above a predetermined value, means dependent upon said voltage equalization for rendering the connecting means between said last-named supply circuit and bus section effective, and means dependent upon the actuation of said connecting means for rendering the connecting means between the two bus sections ineffective.

8. In an electrical system, the combination with two bus sections, connecting means therebetween, a load circuit connected to each bus section, a supply circuit for each bus section, and connecting means between each supply circuit and the corresponding bus section, of means operative while the connecting means between the two bus sections are ineffective and the connecting means between each of the supply circuits and the corresponding bus sections are effective for equalizing the voltages of the two bus sections in response to predetermined conditions, means dependent upon said voltage equalization for rendering the connecting means between the two bus sections effective, and means dependent upon the actuation of said connecting means for rendering the connecting means between one of the supply circuits and the corresponding bus section ineffective.

9. In an electrical system, the combination with two bus sections, connecting means therebetween, a load circuit connected to each bus section, a supply circuit for each bus section and connecting means between each supply circuit and the corresponding bus section, of means operative while the connecting means between the two bus sections are ineffective and the connecting means between each of the supply circuits and the corresponding bus sections are effective, for equalizing the voltages of the two bus sections when the difference in voltage of the two bus sections is below a predetermined value and the total power demand of the two load circuits is below a predetermined value, means dependent upon said voltage equalization for rendering the connecting means between the two bus sections effective, and means dependent upon the actuation of said connecting means for rendering the connecting means between one of the supply circuits and the corresponding bus section ineffective.

10. In an electrical system, the combination with two bus sections, connecting means therebetween, a load circuit connected to each bus section, a supply circuit for each bus section and connecting means between each supply circuit and the corresponding bus section, of means responsive to the potential of both bus sections and co-operating means responsive to the currents traversing both supply circuits for maintaining the connecting means between the two bus sections ineffective and the connecting means between each of the supply circuits and the corresponding bus sections effective.

11. In an electrical system, the combination with two bus sections, connecting means therebetween, a load circuit connected to each bus section, a supply circuit for each bus section and connecting means between each supply circuit and the corresponding bus section, of means responsive to the difference in potential of the two bus sections and co-operating means responsive to the sum of the currents traversing the two supply circuits for maintaining the connecting means between the two bus sections ineffective and the connecting means between each of the supply circuits and the corresponding bus section effective.

12. In an electrical system, the combination with two bus sections, connecting means therebetween, a load circuit connected to each bus section, a supply circuit for each bus section and connecting means between each supply circuit and the corresponding bus section, of a differential relay device energized in accordance with the potentials of both bus sections and a co-operating summating relay device energized in accordance with the currents traversing both supply circuits for maintaining the connecting means between the two bus sections ineffective and the connecting means between each of the supply circuits and the corresponding bus section effective.

13. In an electrical system, the combination with two bus sections, connecting means therebetween, a load circuit connected to each bus section, a supply circuit for each bus section and connecting means between each supply circuit and the corresponding bus section, of means for maintaining the connecting means between the two bus sections ineffective and the connecting means between each of the supply circuits and the corresponding bus section effective while the difference in voltage of the two bus sections is above a predetermined value, and means for maintaining the voltage of each of the load circuits substantially constant at a respectively predetermined value.

In testimony whereof, I have hereunto subscribed my name this 27th day of March, 1924.

CHARLES E. CAREY.